Patented Apr. 10, 1928.

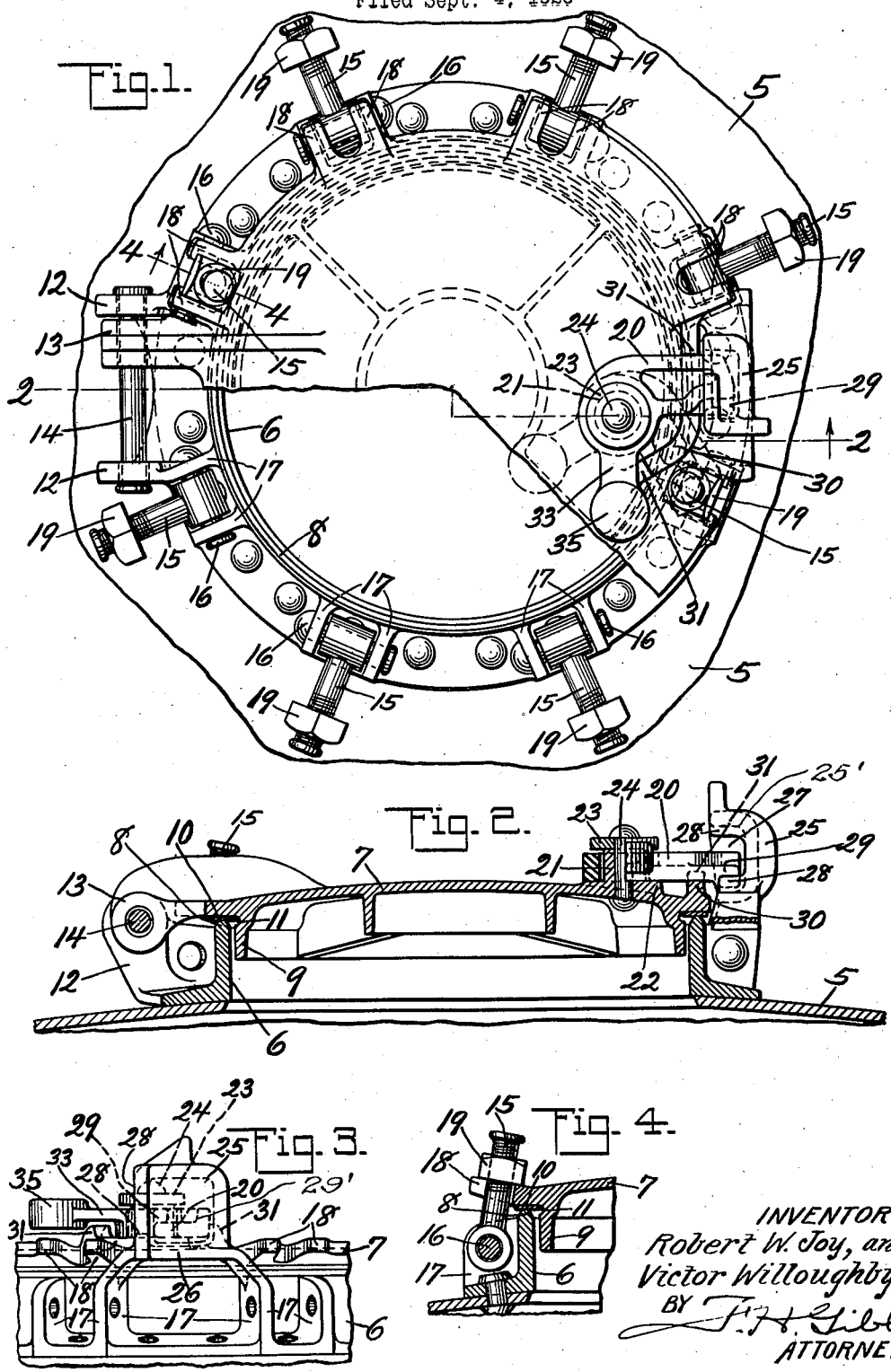

1,665,369

UNITED STATES PATENT OFFICE.

ROBERT W. JOY, OF BROOKLYN, NEW YORK, AND VICTOR WILLOUGHBY, OF RIDGE-WOOD, NEW JERSEY, ASSIGNORS TO AMERICAN CAR AND FOUNDRY COMPANY, OF NEW YORK, N. Y., A CORPORATION OF NEW JERSEY.

CAR-TANK CLOSURE.

Application filed September 4, 1926. Serial No. 133,638.

Our invention relates to car tank closures and the like, and is especially concerned with the prevention of explosions or accidents in opening the covers of tanks in which pressure may exist,—such as the tanks of tank cars used for transporting volatile fluids. It is an object of our invention to make it practically impossible for such a tank cover to be completely opened or released while there is sufficient pressure in the tank to lift the cover, yet at the same time to allow the cover to be partly opened to vent the pressure. We aim to provide a simple, convenient, rugged and inexpensive construction for these purposes.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a plan view of a car tank dome closure conveniently embodying our invention, part of the cover being broken away to show the parts beneath more clearly;

Fig. 2 shows a vertical section through the tank structure, the cover, and parts of the securing means shown in Fig. 1, taken as indicated by the line 2—2 in that figure;

Fig. 3 is a fragmentary view showing the securing means and the associated parts of the tank and cover in elevation, from the right of Fig. 1;

Fig. 4 is a fragmentary vertical sectional view taken through the tank and cover as indicated by the line 4—4 in Fig. 1.

The drawing shows a car tank dome head 5 having therein a manhole opening with a flanged manhole or dome ring 6 secured to said head 5 around the opening. The manhole cover 7 is adapted to seat on the reduced (oppositely bevelled) edge 8 of the manhole ring 6, and has a depending annular flange 9 that lies within the dome ring 6,—with some little clearance between. A gasket 10 for making a pressure-tight joint is shown between the seating margin of the cover 7 and the tank ring seat 8, with its inner edge accommodated and engaged in a groove 11 at the root of the cover flange 9. The cover 7, it will be seen, opens and closes toward and from the manhole opening, and is in the present instance swingably mounted on the tank structure. For this latter purpose, the ring 6 is provided with hinge lugs 12 and the cover 7 with corresponding hinge lugs 13, located between the dome hinge lugs 12. These hinge lugs 12 and 13 have vertically elongated openings for a pivot pin 14. The cover 7 may normally be held tight shut on its seat 8 by any suitable means, such as eye bolts 15 mounted on pivots 16 in pairs of lugs 17, 17 on the dome ring 6. To secure the cover 7, the bolts 15 are swung up between pairs of projecting ears or lugs 18, 18 on the cover 7, and their nuts 19 tightened down on said lugs,—as shown in Figs. 1 and 4 for the bolt 15 just behind the hinge connections 12, 13, 14. To release the cover 7, the nuts 19 are loosened and the bolts 15 swung outward into the position shown for most of them in Fig. 1.

In order to prevent accidental blowing off of the cover 7 as the result of incautious loosening and releasing of the bolts 15, we provide additional securing or restraining means, adapted to limit the rise of the cover 7 from the ring 6 even after all the bolts 15 are released. The restraining means for this purpose comprises co-operating parts on the cover 7 and on the tank structure 5, one of which parts is preferably movable substantially horizontally with reference to the cover or the tank opening. As shown in Figs. 1 and 2, the movable part consists of a dog 20 pivoted on a stud 21 upstanding from a boss 22 on the cover 7, and secured by a cap plate or washer 23 and a rivet 24 extending through the stud 21 and the boss 22. The dog 20 co-operates with engagement means in the form of a socket 25 on the dome ring 6, which socket is in the present instance cast integral with a bridge portion 26 (Fig. 3) integrally interconnecting adjacent lugs 17. When the free end of the dog 20 is in this socket 25, it is impossible for the cover 7 to rise further than allowed by the clearance that exists between the dog 20 and the top of the socket when the cover is tightly closed; yet when the bolts 15 are released and the cover raised to this limit, a sufficient opening is afforded to vent gas pressure from the tank without blowing out any of the liquid.

In order to prevent the dog 20 from being disengaged from the socket 25 prematurely, the mouth or opening through which the dog may enter and leave the socket is narrowed as compared with the general vertical internal height of the socket, and is so located that the dog will only lie opposite the opening when the cover 7 is in a suitable definite position. As shown in Figs. 2 and 3, the socket 25 has only a single mouth opening 27, at its end which fronts forward in Figs. 1 and 2 and to the left in Fig. 3. As shown in Figs. 2 and 3, this mouth opening 27 is located at an intermediate point in the height of the socket 25, somewhat below its top as well as somewhat above its bottom, between upper and lower shoulders or lips 28, 28. These lips 28, 28 are, in effect, limiting stops at each end of a recess formed in the face of the socket member 25. When the cover is tightly closed as in Fig. 2, the lower lip 28 stands directly in front of the dog 20, so that it is impossible for the dog to be disengaged from the socket 25 before the nuts 19 of the bolts 15 have all been loosened up. Further, it will be apparent that in order to swing the cover 7 on its hinge, it is necessary that all of the bolts 15 be freed from their engagement with the lugs 18. Having released the bolts from their engagement with the lugs 18, pressure within the tank will cause the cover to rise and if this pressure is sufficient to be dangerous, it will raise the cover until the dog 20 is elevated and positioned behind the upper shoulder 28 in the recess, the dog bearing against the upper portion 25' of said recess, and the cover will remain up (with the dog 20 engaged and "locked" in the top of the socket 25) until the pressure has been fully vented from the tank, so as to make release of the cover perfectly safe. This is indicated by the cover 7 dropping back on its seat 8,—whereupon it may be lifted from the outside until the dog 20 comes in line with the socket mouth 27, so that said dog can be swung out and disengaged. Thus completely released, the cover 7 can be lifted wide open at once.

As shown in Figs. 1, 2 and 3, the end of the dog 20 is reduced for a portion thereof as indicated at 29 to facilitate the disengagement of the dog from the socket 25. It will be apparent that the dog 20 may be easily entered into the socket 25 when the cover is in closed position, but the removal of the dog from the socket sometimes offers a little difficulty due to the fact that the cover may be raised excessively. To eliminate this disadvantage and to provide an easy disengagement for the dog the latter, as before mentioned, is provided with the reduced end portion. When it is desired to remove the dog from the socket, the cover is lifted to permit the dog to swing on its pivot and out of the socket and during such movement the dog 20 must clear the lip 28. The tendency is to elevate the cover too much whereupon the upper face of the larger portion of the dog will contact with the upper portion 25' of the recess. By reducing the size of the dog 20, as shown at 29, the dog can be swung on its pivot and out of the opening 27 even though the dog 20 in its entirety be raised too high with the higher portion of the end in contact with the upper portion 25'. This is particularly so in view of the fact that in reducing the dog 20 at 29 a sharp angle is avoided and the side 29' is slightly curved to merge with the upper surface of the reduced portion 29 and thus form a bearing surface to guide the dog 20, including its higher portion, out of the opening. A guide ridge 30 may also be provided on the cover 7 for the lower side of the dog 20, and stop shoulders 31, 31 to limit the horizontal swing of the dog to a convenient range. The dog 20 may be provided with a convenient lateral arm or handle 33 for manual manipulation of the dog. Preferably, provision is made for automatically having the dog 20 in release position when the cover 7 is lowered, so as to pass the socket 25. For this purpose, the dog 20 may be so weighted or loaded with reference to its pivotal axis 21 as to be automatically held in released position (or return to that position if displaced) while the cover 7 is raised off its seat 8 substantially,—as by means of an enlargement 35 at the end of the handle 33.

What is claimed is:

1. The combination with a tank opening cover of the character described, of restraining means movably mounted on the cover for limiting the rise thereof, and co-operating engaging means on the tank, said restraining means being releasable only when the cover is partly raised.

2. The combination with a tank opening cover of the character described arranged to open and shut from and toward the opening, of restraining means for limiting rise of the cover from the opening movable substantially horizontally with respect to the latter to disengage said restraining means and release the cover, but releasable only when the cover is partly raised from the opening.

3. The combination with a tank opening cover of the character described arranged to open and shut from and toward the opening, of restraining means for limiting rise of the cover from the opening movable substantially horizontally with respect to the latter, and a socket for said means presenting a narrowed mouth at an intermediate point in the height of the socket, so that said means can be released only when the cover is raised less than permitted by the socket.

4. The combination with a tank opening cover of the character described arranged to open and shut from and toward the opening, of a dog pivoted on the cover to swing substantially horizontally with respect to the opening, and a socket for said dog on the tank presenting a narrowed mouth above the position of the dog when the cover is fully closed.

5. The combination with a tank opening cover of the character described, of means for holding the cover tight on the opening and restraining means for limiting rise of the cover from the opening movable substantially horizontally with respect to the latter to disengage said restraining means and release the cover, but releasable only when the cover is partly raised from the opening.

6. The combination with a tank opening cover of the character described hingedly mounted to swing in opening and closing, of securing means mounted on the cover to move substantially horizontally with respect thereto to engage and disengage with corresponding means on the tank, said securing means being so formed and positioned as to be automatically arranged in release position when the cover is swung closed, so as to pass said means on the tank.

7. The combination with a tank opening cover of the character described hingedly mounted to swing up and down in opening and closing, of a securing device pivoted on the cover to swing thereon to engage and disengage with corresponding means on the tank, and weights on said securing device for automatically positioning the latter in such position as to pass the means on the tank when the cover is swung on its hinge to closed position.

8. The combination with a tank opening cover of the character described, of restraining means movably mounted on the cover for limiting the rise thereof, and co-operating engaging means on the tank, said restraining means being releasable from said engaging means only when said cover is in a predetermined position.

9. The combination with a tank opening cover of the character described, of engaging means mounted adjacent the cover, and restraining means mounted on the cover and cooperating with said engaging means to limit the rise of the cover and to initially position the same, said means being releasable from the engaging means only when said cover is in a predetermined position.

In witness whereof we have hereunto set our hands.

ROBERT W. JOY.
VICTOR WILLOUGHBY.